United States Patent [19]

Takahashi et al.

[11] Patent Number: 4,551,645
[45] Date of Patent: Nov. 5, 1985

[54] DISC TYPE BRUSHLESS MOTOR

[75] Inventors: Yoshiteru Takahashi, Yamakita; Masataka Ogawa, Atsugi, both of Japan

[73] Assignee: Fuji Photo Film Co., Ltd., Japan

[21] Appl. No.: 384,598

[22] Filed: Jun. 3, 1982

[51] Int. Cl.⁴ ............................................ H02K 37/00
[52] U.S. Cl. ..................................... 310/46; 310/156; 310/198
[58] Field of Search ................... 310/46, 156, 198, 256

[56] References Cited

U.S. PATENT DOCUMENTS

| | | | |
|---|---|---|---|
| 3,077,548 | 2/1963 | Moressée et al. | 310/268 |
| 3,906,267 | 9/1975 | Coupin et al. | 310/268 |
| 3,988,024 | 10/1976 | Watanabe et al. | 310/268 |
| 4,009,406 | 2/1977 | Inariba | 310/156 |
| 4,072,881 | 2/1978 | Ban | 310/268 |

Primary Examiner—Peter S. Wong
Assistant Examiner—Anita M. Ault
Attorney, Agent, or Firm—Murray, Whisenhunt & Ferguson

[57] ABSTRACT

A disc type brushless motor comprising a rotor provided with a field magnet having two or more poles, and a stator on which loop-like armature windings are flatly positioned opposite to the field magnet in quantity of two or more in the circumferential direction and in two stages or more in the radial direction. The stator is also provided with elements for detecting the poles of the field magnet. The armature windings are positioned so that they do not overlap in either the circumferential or the radial directions of the stator. One terminal of each armature winding is connected to a common line and the other thereof to a semiconductor rectifier. Each pole of the field magnet may consist of a plurality of segments in the form of a fan-like plate or a square plate.

19 Claims, 25 Drawing Figures

DISC TYPE BRUSHLESS MOTOR

BACKGROUND OF THE INVENTION

1. Field of the Invention

This invention relates to a disc type brushless motor, and more particularly to a disc type brushless motor comprising many armature windings and field magnets specially arranged to obtain excellent performance.

2. Description of the Prior Art

Motors are generally classified into AC motors and DC motors and into rotating motors and linear motors. Rotating motors can be divided into core motors and coreless motors or into cup (cylindrical) type motors and disc type motors (flat in the direction of the motor shaft). Rotating motors can also be divided into commutator motors and brushless motors.

Small disc type brushless motors, which have a flat disc-like shape, have recently come to replace cylindrical motors in cassette tape recorders, record players and other audio equipment. Small DC motors of this type are also replacing cylindrical motors in other applications. However, to construct a large disc type brushless motor having a diameter of for example 40 cm for use in special fields such as video equipment, it is necessary to use a very large field magnet, loop-like armature windings, an expensive rotation shaft and expensive bearings. Particularly, it is difficult and very expensive to form a field magnet having a diameter of about 30 cm and comprising 2 m north and south poles, wherein m designates a positive integer, which are alternately arranged at equal intervals. This is partially because the quantity of production of large special disc type brushless motors having a diameter of about 40 cm is limited. Further, to construct a large motor of this type, it is essential to use large loop-like armature windings, which are difficult to form and tend to exhibit insufficient strength because of their large size. Therefore, their strength must be increased by using an expensive plastic molding process, resulting in a high cost as in the case of the above-mentioned field magnet having a diameter of about 30 cm.

As described above, conventional disc type brushless motors having a diameter of for example 40 cm are very expensive. This problem is aggravated by their special applications and by the small quantity of production of such motors compared with that of small motors of this type. Thus a need exists for an inexpensive, efficient, large disc type brushless motors.

Further, motors used in special applications such as video equipment should be disc-shaped and allow special rotational drive at an extremely high efficiency. They should also be highly durable since they are used in a very expensive apparatus. Brushless motors are suitable for this purpose because they can be shaped into a disc and because they have long service life because of the absence of commutators. However, to greatly increase the efficiency of disc type brushless motors, it is necessary to use very many armature windings. In this connection, the conventional motors of this type are disadvantageous as described below with reference to FIGS. 1 to 7.

FIG. 1 is a plan view showing a bow-like armature winding used in a conventional disc type brushless motor, FIG. 2 is a plan view showing a number of the armature windings of the type shown in FIG. 1 arranged for use in a motor, and FIG. 3 is a developed view showing the arrangement of the armature windings of FIG. 2 and a field magnet. In FIG. 1, the bow-like armature winding 2 used in a conventional disc type brushless motor is formed so that the angle (180°) between radial conductor sections A is approximately equal to the pole width (180°) of a two-pole field magnet 1 shown in FIG. 3. The flat disc type brushless motor (not shown) has an interior space in which a rotation shaft is supported approximately at the center of the disc perpendicularly thereto. The field magnet 1 is secured perpendicularly to the rotation shaft. In the interior space of the motor, 13 bow-like armature windings 2 as shown in FIG. 1 are superposed one upon another as shown in FIG. 2 and opposed to the field magnet 1. FIG. 3 shows the development of the field magnet 1 and the armature windings 2 superposed one upon another as described above. It will be understood mainly from FIGS. 2 and 3 that, with the conventional disc type brushless motor, all of conductor sections A, B and B' of the armature windings 2 overlap one upon another, and the thickness thereof becomes extremely large. As a result, the air-gap between the mounts of the field magnet 1 and the armature windings 2 increases, making it impossible to obtain high motor torque and efficiency. Further, in case the armature windings 2 are superposed one upon another in a motor, it is difficult to treat the coil ends. Thus the conventional disc type brushless motor is not suitable for mass production, requires a high production cost, and is difficult to construct in the form of an extremely thin disc.

To solve the above-mentioned problems, it has recently been proposed to increase the number of north and south poles alternately magnetized at equal intervals, decrease the angle between the radial conductor sections of the armature windings 2 to match the increase in the number of magnetic poles, increase the number of the armature windings 2, and position the armature windings 2 at equal intervals so that they do not overlap one upon another. This type of brushless motor can be constructed in a form thinner than that shown in FIGS. 1 to 3, but is not yet completely satisfactory for the reasons described below. Namely, also in this disc type brushless motor, even if the number of the north and south poles of the field magnet is increased, the armature windings naturally overlap one upon another when the number thereof increases.

FIG. 4 is a plan view showing an arrangement of seven armature windings used in a conventional disc type brushless motor, and FIG. 5 is a developed view showing the arrangement of the armature windings of FIG. 4 and a four-pole field magnet. In FIGS. 4 and 5, the armature windings 2 are positioned to minimize overlapping thereof. Generally, it will be possible to position the armature windings 2 so that they do not overlap one upon another if the number of the north and south poles of the field magnet is increased and the angle between the radial conductor sections of each armature winding 2 is reduced. However, in case the field magnet has four poles and seven armature windings 2 are used as shown in FIGS. 4 and 5, it is difficult to completely avoid overlapping of the armature windings 2.

FIG. 6 is a plan view showing a 20-pole field magnet, and FIG. 7 is a plan view showing 13 armature windings positioned at equal circumferential intervals so that they do not overlap one upon another. To position many armature windings 2 at equal intervals so that they do not overlap one upon another, it is necessary for example to form a flat doughnut-like field magnet 1 having 10 north poles and 10 south poles alternately positioned at equal intervals as shown in FIG. 6. In this case, as shown in FIG. 7, each armature winding 2 should be looped in a fan shape so that the angle between the radial conductor sections thereof contributing to generation of torque is approximately identical with the pole width of the field magnet 1, and 13 such armature windings 2 should be positioned at equal intervals so as to eliminate overlapping thereof. With the arrangement shown in FIGS. 6 and 7, if the field magnet 1 has more than 20 poles and the number of the armature windings 2 is further increased, the armature windings naturally overlap one upon another. To eliminate their overlapping, the number of poles of the field magnet 1 must further be increased, and at the same time the angle between the radial conductor sections of each armature winding 2 must be reduced to increase the number thereof. However, increasing the numbers of the field magnet poles and the armature windings in this way detracts from the usefulness of the motor.

In a study of conventional disc type brushless motors of the type described above, it was noted that the disc type motors should not be too long in the direction of the rotation shaft but that, in many motors of this type, the radius may be increased. Therefore, it is advantageous to utilize this permissible condition as much as possible. In the past, however, this permissible condition was not noticed, and studies were directed only to the application of cup type motors and known disc type motors.

In making the present invention, study was further conducted to find disadvantages of the arrangement shown in FIGS. 6 and 7, taking the above-mentioned permissible condition into consideration. The study revealed that the following conditions should be satisfied:

(1) The armature windings 2 should be positioned at equal intervals so that they do not overlap one upon another.

(2) The number of the armature windings 2 should be increased to obtain a disc type motor capable of generating a high torque and exhibiting high efficiency. In addition, the motor should be able to rotate smoothly with little torque ripple.

(3) The conditions (1) and (2) should be satisfied without greatly increasing the number of poles of the field magnet 1.

In connection with these basic conditions (1) to (3), the following should be noted:

(4) In case the disc type brushless motor has a large size, for example a diameter of 40 cm, it is very difficult and expensive to form a flat doughnut-like field magnet 1 having a diameter of 30 cm or more as shown in FIG. 6. This problem is aggravated by the generally small number of large special disc type brushless motors having a diameter of about 40 cm which are produced. For example, the cost of dies for making a field magnet 1 having a diameter of 30 cm as shown in FIG. 6 amounts to about ten million yen, and other expensive components are also needed. Thus a need exists for an inexpensive field magnet 1.

(5) As described above, each armature winding 2 is looped so that the angle between the radial conductor sections thereof contributing to generation of torque is approximately equal to the pole width of the field magnet 1. Therefore, when a field magnet 1 having a diameter of 30 cm is used, the armature winding 2 positioned opposite thereto must be in the form of a large loop. However, a large loop armature winding 2 exhibits small strength and tends to break due to external shocks or the like, particularly when the conductor of the armature winding is not so thick. This problem adversely affects reliability and must be eliminated in an expensive motor of this type. Although this problem can be solved by using self-fusing conductors for making the loop-like armature winding 2 or by looping a conductor and fixing the conductor sections of the loop through plastic molding process, these approaches are very expensive, resulting in very expensive motors.

SUMMARY OF THE INVENTION

The primary object of the present invention is to provide a disc type brushless motor which is thin in thickness and inexpensive to manufacture and yet exhibits high performance.

Another object of the present invention is to provide a disc type brushless motor whose characteristics can be easily altered in various ways.

The specific object of the present invention is to provide a disc type brushless motor, in which the number of motor phases can be greatly increased and torque ripple can be minimized to obtain smooth rotation.

The above objects can be accomplished by a disc type brushless motor comprising a rotor means provided with a 2 m-pole field magnet consisting of north and south poles alternately positioned, wherein m designates a positive integer of 1 or larger, and a stator means provided with loop-like armature windings in which the angle between radial conductor sections of each armature winding is approximately equal to the pole width of said field magnet, said armature windings being flatly positioned opposite to said field magnet in a quantity of two or more in the circumferential direction of said stator means and in two stages or more in the radial direction thereof, said stator means being also provided with position detecting elements for detecting said poles of said field magnet. The disc type brushless motor in accordance with the present invention is a DC rotating motor capable of exhibiting a long service life. The technical effects of the motor in accordance with the present invention can be obtained when it is constructed in a disc form, instead of a cup form. Although the motor in accordance with the present invention may be a disc type commutator motor, the technical effects of the present invention can enhanced when it is constructed as a disc type brushless motor.

The present invention will further be described below with reference to the accompanying drawings.

DESCRIPTION OF THE PREFERRED EMBODIMENTS

The present invention will hereinbelow be described in further detail with reference to the accompanying drawings.

Figure 8:
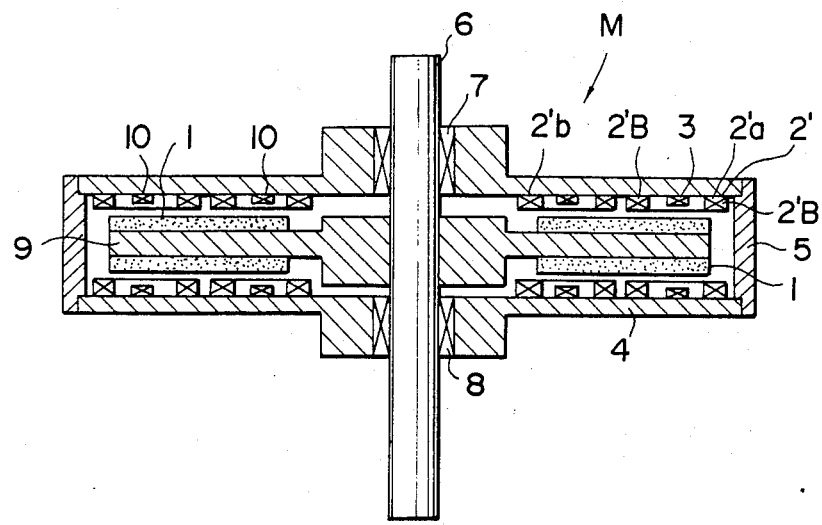
FIG. 8 is a longitudinal sectional view showing an embodiment of the disc type brushless motor in accordance with the present invention.

Referring to FIG. 8 showing an embodiment of the brushless motor in accordance with the present invention, the motor is generally designated by reference character M. The body of the brushless motor M is formed by spacing square yokes 3 and 4 from each other and supporting them by stays 5 at four sides. The square yokes 3 and 4 are made of a magnetic material such as soft steel plate. A rotating shaft 6 is rotatably supported by bearings 7 and 8 approximately at the center of the brushless motor M. In the space between the yokes 3 and 4, a disc-like yoke 9 made of a magnetic material is secured to the rotating shaft 6 at right angles so as to rotate together therewith. Annular field magnets 1 are secured to the upper and lower surfaces of the yoke 9. On each of the inner surfaces of the body of the brushless motor M (i.e. the surface of the yokes 3 and 4) facing the field magnets 1, armature windings 2' are positioned in two stages or more (two stages in the embodiment shown in FIG. 8) in the radial direction. Each armature winding 2' is formed by turning a conductor many turns in (fan) loop shape so that the angle between the radial conductor sections thereof is approximately equal to the pole width of the field magnet 1.

Figure 1:
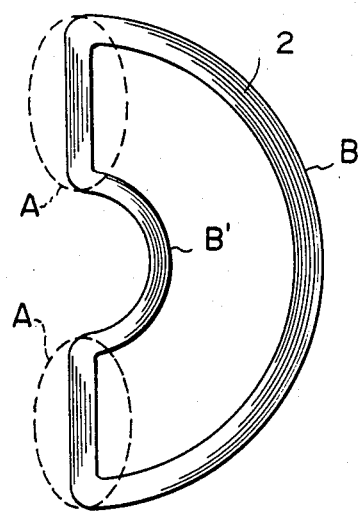
FIGS. 1 to 7 show conventional disc type brushless motors.
Figure 2:
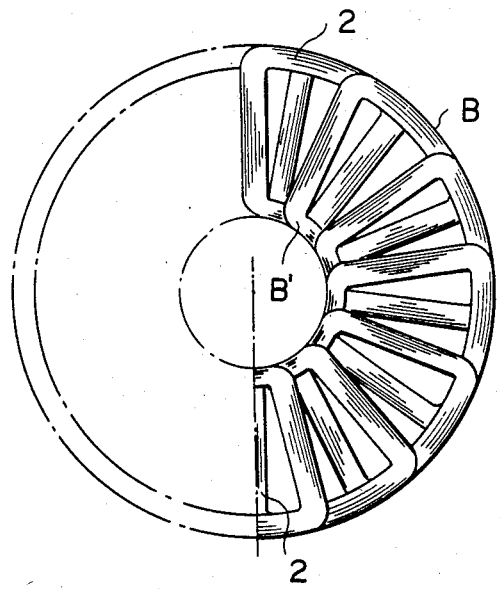
Figure 3:
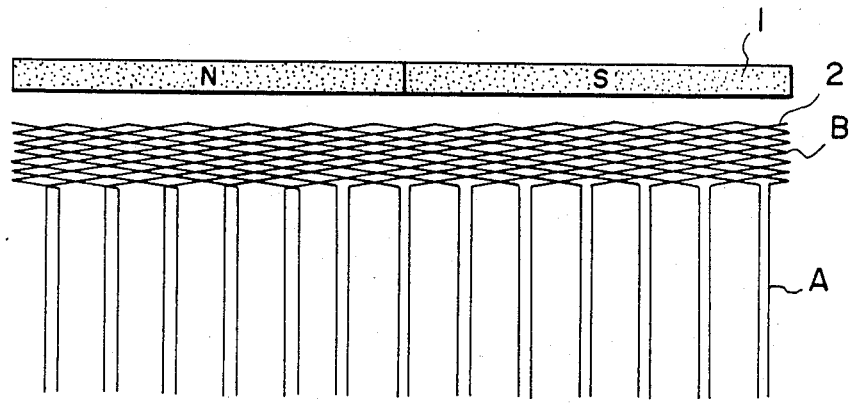
Figure 4:
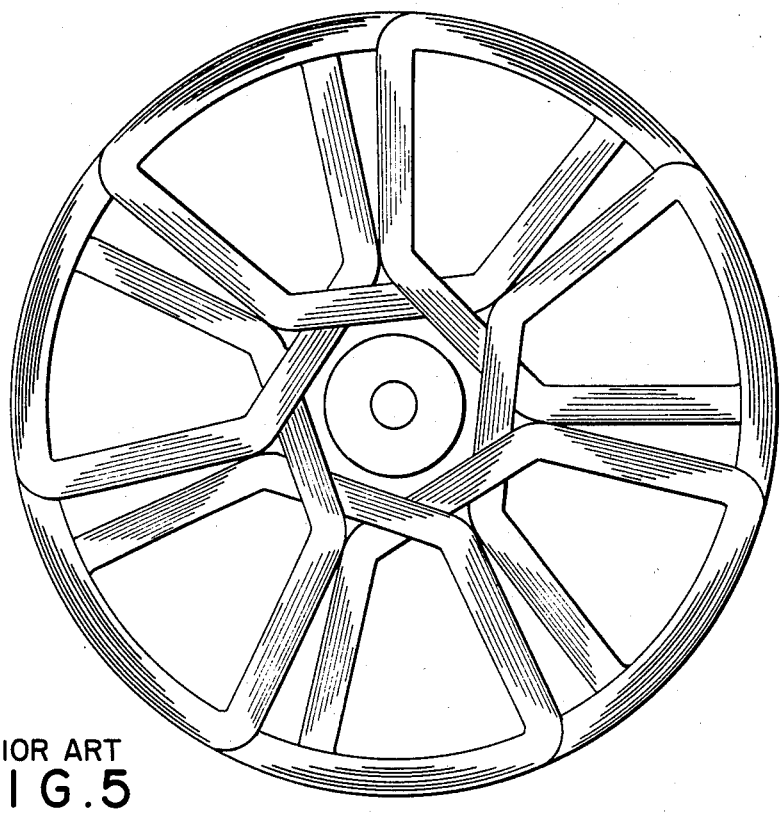
Figure 5:
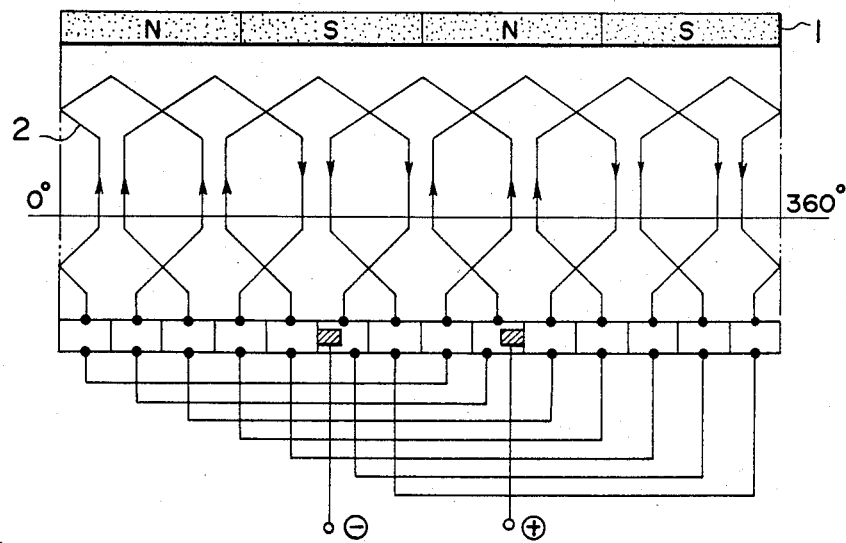
Figure 6:
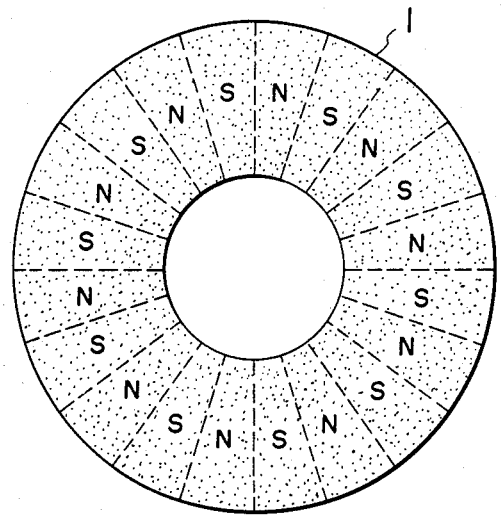
Figure 7:
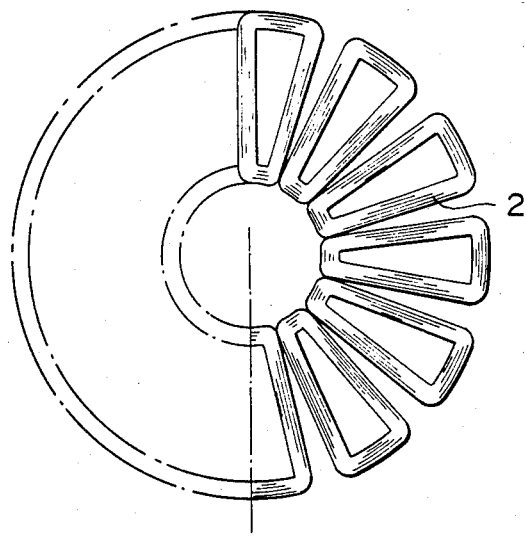

In the present invention, the annular field magnets 1 may be of the type shown in FIG. 6. However, as mentioned previously, the field magnet shown in FIG. 6 is very expensive to manufacture. To solve this problem, it is advantageous to divide the fan-like field magnet segment of the field magnet shown in FIG. 6 into small square plate-like segments.

Figure 9:
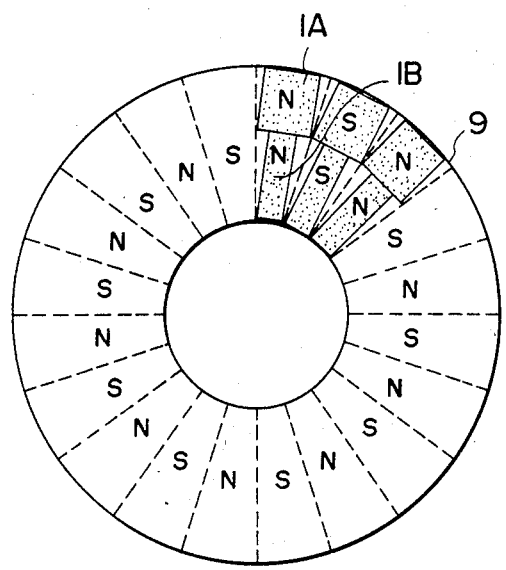
FIGS. 9 and 10 are explanatory views showing embodiments of the field magnets used in the motor in accordance with the present invention.

FIG. 9 shows an embodiment of the field magnet 1 used in the brushless motor shown in FIG. 8. In FIG. 9, each magnetic pole of the annular field magnet 1 is divided into segments 1A and 1B. It may be divided into three or more segments. Although these segments are shown only for three poles in FIG. 9, it should be understood that all poles of the field magnet 1 are divided into segments similarly. In FIG. 9, each pole of the field magnet 1 is formed by radially securing two field magnet segments 1A and 1B to the surface of the yoke 9 so as to conform to a predetermined pole width. In this case, the field magnet 1 and consequently the disc brushless motor M can be manufactured inexpensively. Alternatively, as shown in FIG. 10, the field magnet 1 may be formed by using fan plate-like field magnet segments 1'A and 1'B.

Figure 10:
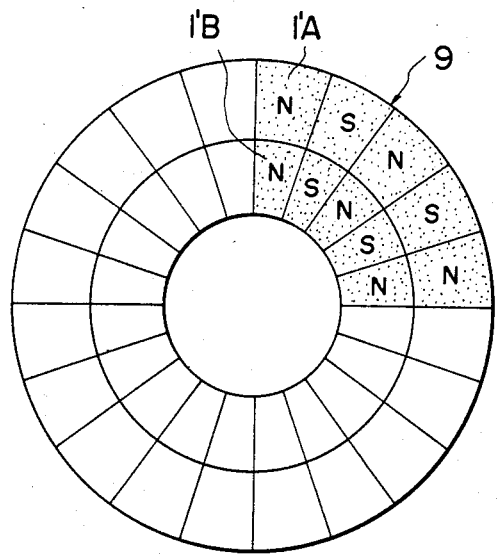

In FIGS. 9 and 10, the field magnet segments 1A, 1B, 1'A, 1'B need not be made of the same material. In a rotating motor, a high torque is required at the outer circumference thereof. Therefore, it is advantageous that the magnetic force of the field magnet segments be increased radially outwardly. For this purpose, the field magnet segment 1A or 1'A may for example be made of a samarium magnet exhibiting strong magnetic force, and the field magnet segment 1B or 1'B be made of a ferrite magnet which is cheap and exhibits weaker magnetic force. Further, in FIGS. 9 and 10, segments 1A and 1B, 1'A and 1'B are positioned so as to contact each other. However, since radial conductor sections 2'B and 2'B' of the armature winding 2' do not contribute to generation of torque and need not be opposed to field magnet segments 1A, 1B, 1'A, 1'B, it is possible to further decrease the sizes of these segments.

Figure 11:
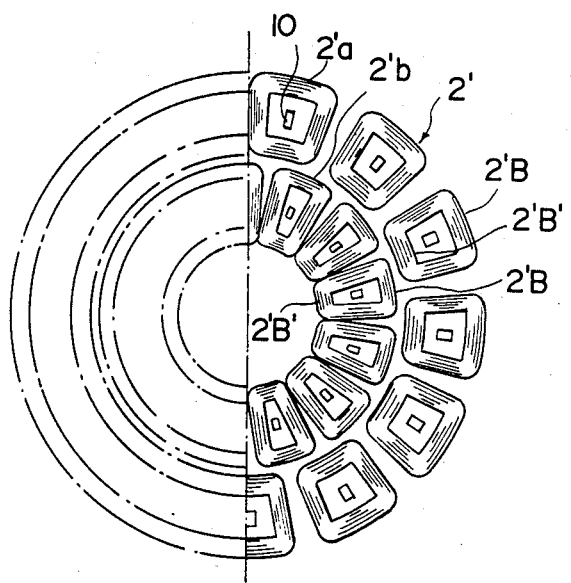
FIG. 11 is a plan view showing an embodiment of the arrangement of armature windings used in the motor in accordance with the present invention.

FIG. 11 shows an embodiment of the arrangement of armature windings used in the motor shown in FIG. 8. As shown in FIG. 11, 13 loop-like armature windings 2'a are positioned along the outer circumference, and 13 loop-like armature windings 2'b are positioned along the inner circumference. In this way, the windings 2'a and 2'b are positioned in two stages in the radial direction (they may also be positioned in three stages or more). These windings 2'a and 2'b are secured on the surface of each of the yokes 3 and 4 opposed to the field magnet 1. Each of the windings 2'a and 2'b is looped so that the angle between the radial conductor sections thereof contributing to generation of torque is approximately equal to the pole width of the magnet 1. The inner armature windings 2'b are circumferentially out of phase with respect to the outer armature windings 2'a. For example, they are positioned out of phase by a magnetic angle of 90° or 270° from each other. Further, neither the armature windings 2'a nor the 2'b are positioned not to overlap one upon another either radially or circumferentially. Therefore, the air-gap between the yoke 9 and the yokes 3, 4 can be minimized so that the disc type brushless motor M can generate a high torque and exhibit high efficiency and can be made in the form of an axially very thin disc. Furthermore, the arrangement of the armature windings 2'a and 2'b shown in FIG. 11 is very advantageous to eliminate or minimize overlapping thereof even when the number of windings is greatly increased. With this arrangement, it is also possible to obtain a polyphase motor M exhibiting high performance and extremely reduced torque ripple because the number of phases of the motor can be increased twice, thrice or more over the conventional disc type motors. In the embodiment shown in FIG. 11, 13 windings 2'a and 13 windings 2'b give 26 phases. When these windings are positioned on both yokes 3 and 4, it is possible to obtain a 46-phase motor M. Moreover, the armature windings 2'a and 2'b in FIG. 11 can be formed as small loops and, therefore, have higher strength than the large loop windings used in the conventional disc type brushless motors.

In FIG. 11, position detecting elements 10 such as Hall effect devices are positioned inside the loops of the windings 2'a and 2'b so as to obtain the same effect as when they are positioned on the radial conductor sections of the windings 2'a and 2'b contributing to generation of torque. This arrangement of the position detecting elements 10 is effective for minimizing the air-gap between the yoke 9 and the yokes 3, 4 so as to obtain a high torque and to minimize the thickness of the motor M. Namely, if the position detecting elements 10 are positioned on the radial conductor sections of the windings 2'a and 2'b according to conventional procedure, the air-gap increases, the torque drops and the motor M becomes thick.

Figure 12:
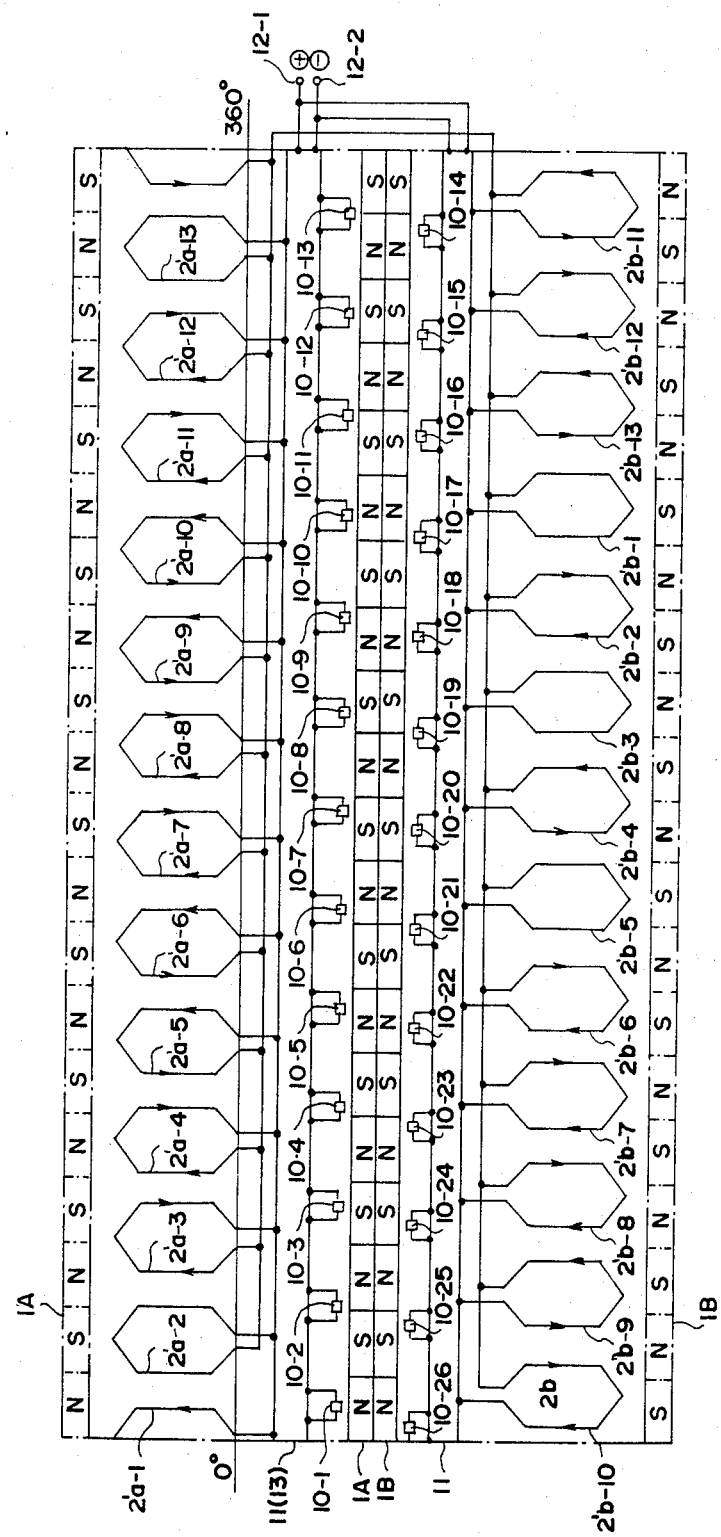
FIG. 12 is a developed view showing an embodiment of the arrangement of armature windings and field magnet used in the motor in accordance with the present invention.

FIG. 12 is a developed view showing the arrangement of the field magnet 1 (consisting of segments 1A and 1B) shown in FIG. 9 and the armature windings 2'a and 2'b shown in FIG. 11. As shown in FIG. 12, one terminal of each armature winding 2'a, 2'b is connected to a common line in the motor M, and the other terminal thereof to a semiconductor rectifier 11 for the reason described later. The semiconductor rectifier 11 is connected to a positive power terminal 12-1 and a negative power terminal 12-2.

Figure 13:
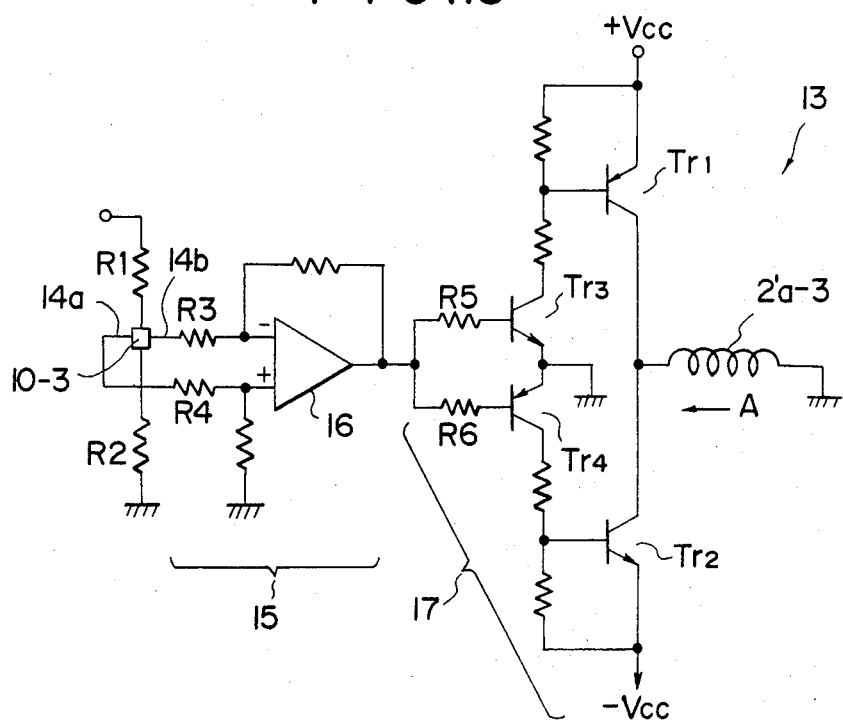
FIG. 13 is an explanatory view showing an embodiment of the semiconductor rectifier employed in the motor in accordance with the present invention.
Figure 14:
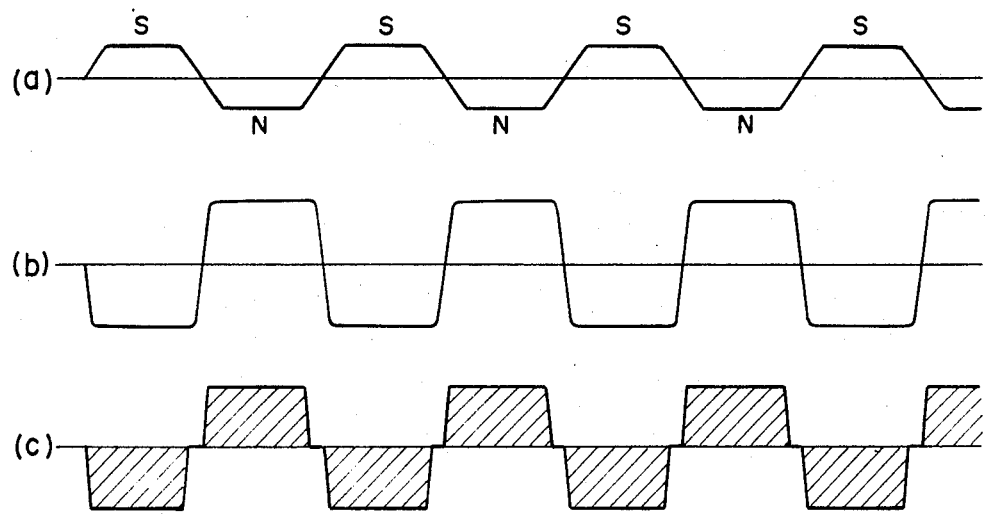
FIG. 14 is an explanatory view showing waveforms output from the component blocks of the semiconductor rectifier shown in FIG. 13.

The semiconductor rectifier 11 may for example consist of a plurality of semiconductor rectifying devices 13 (in the same quantity as the windings 2'a and 2'b) as shown in FIG. 13. In FIG. 13, a position detecting element 10-3 may be a Hall effect element having four terminals, and is positioned between resistors R1 and R2. (To simplify the illustration, the position detecting elements 10 are shown in FIG. 12 as being connected to the radial conductor sections of the windings 2'a and 2'b contributing to generation of torque.) The position detecting elements 10 detect the north and south poles of the field magnet 1 to feed currents in appropriate directions to the armature windings 2'a and 2'b. As shown in FIG. 12, the element 10-3 is opposed to the south pole of the field magnet segment 1A and detects it. Therefore, the element 10-3 outputs a wave as shown in FIG. 14 (A). In FIG. 13, terminals 14a and 14b of the element 10-3 are connected to an inverting amplifier 15. The inverting amplifier 15 amplifies the output voltage of the element 10-3 and outputs a wave as shown in FIG. 14 (B). The output of the amplifier 15 is fed to a current amplifier 17, which outputs a wave as shown in FIG. 14 (C). Because the element 10-3 detects the south pole, its output is sent through a resistor R3 and voltage-amplified by an operational amplifier 16, and then sent through a resistor R6 to activate a transistor Tr4 (at this time, transistor Tr1 and Tr3 are off) and transistor Tr2. In this way, a current flows through the corresponding armature winding 2'a-3 in the direction of the arrow A. When the element 10-3 detects the north pole, its output is sent through a resistor R4 to the operational amplifier 16, where it is voltage-amplified. The voltage-amplified output is then sent through a resistor R5 to activate the transistor Tr3 (transistors Tr2 and Tr4 are off) and transistor Tr1. Therefore, a current flows through the armature winding 2'a-3 reversely to the direction of the arrow A. The semicondutor rectifying devices 13 for other armature windings 2'a and 2'b work in the same manner. In FIG. 12, elements 10-2, 10-13, 10-17, 10-19 and 10-21 detect boundaries between the north and south poles. Therefore, these elements produce no output and no current flows through armature windings 2'a-2, 2'a-13, 2'b-1, 2'b-3 and 2'b-5.

The reason why one terminal of each armature winding 2'a, 2'b is connected to a common line and the other terminal thereof to the semiconductor rectifier 11 (13) is described hereinbelow. The technical effects of this connecting method in accordance with the present invention increase as the number of the armature windings increases. Particularly when the number of the armature windings 2'a, 2'b circumferentially positioned is seven or more, this connection method makes it possible to effectively energize the armature windings and provide a high-efficiency disc type brushless motor M exhibiting an increased starting torque.

Figure 15:
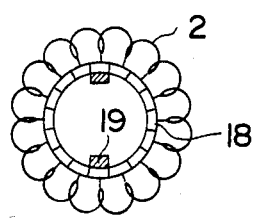
FIG. 15 is an explanatory view showing the principle of construction of a conventional commutator motor having seven armature windings in the circumferential direction.
Figure 16:
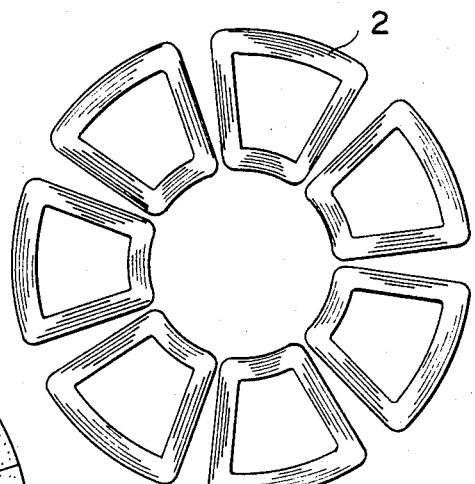
FIG. 16 is a plan view showing seven armature windings conventionally positioned in the circumferential direction.
Figure 17:
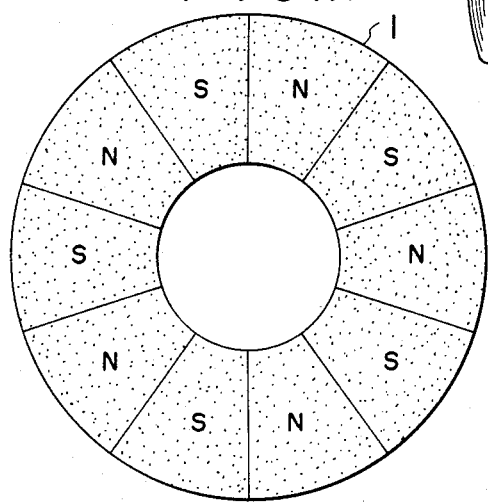
FIG. 17 is a plan view showing a 10-pole field magnet used for the arrangement shown in FIG. 16.
Figure 18:
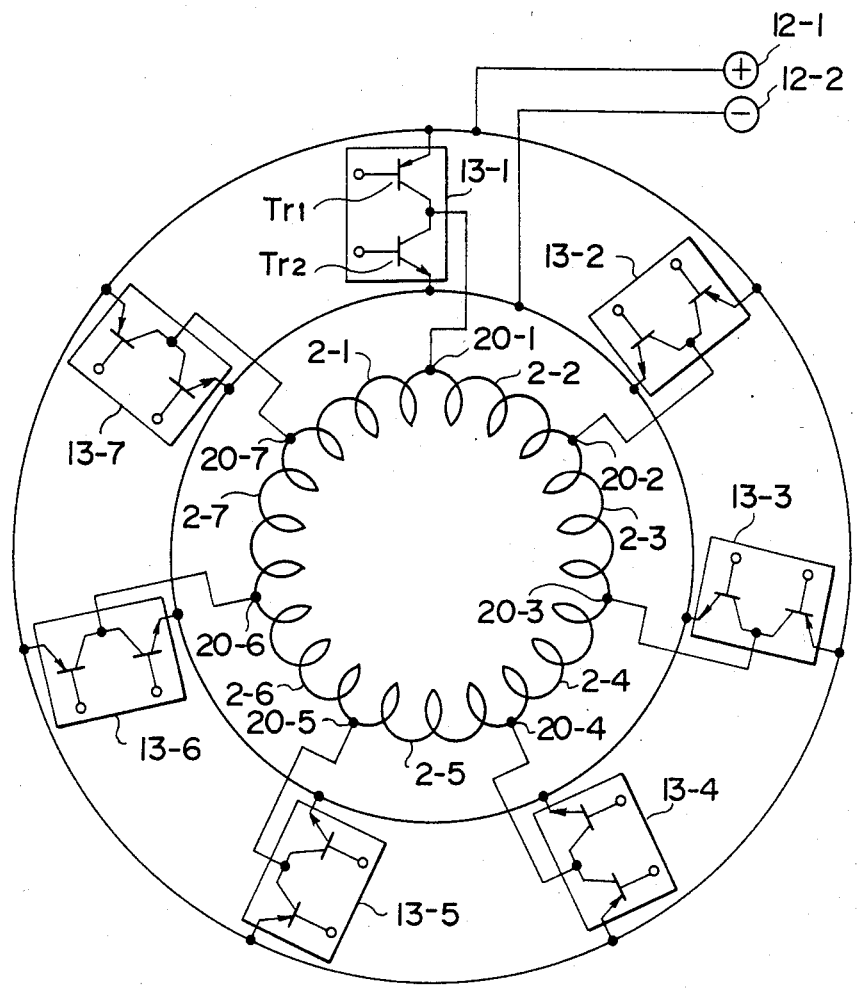
FIG. 18 is an explanatory view showing the principle of construction of a brushless motor to replace the commutator motor shown in FIG. 15.

FIG. 15 shows the construction of a conventional commutator motor having seven or more armature windings 2. The motor shown is of singly re-entrant simplex winding in which a closed circuit is formed around a core. In FIG. 15, reference number 18 designates a commutator and 19 a brush. Besides the singly re-entrant simplex winding, the singly re-entrant duplex winding and the composite re-entrant duplex winding are already known. When the commutator motor shown in FIG. 15 is replaced by a brushless motor having seven armature windings 2 positioned as shown in FIG. 16 and a 10-pole field magnet 1 alternately magnetized to the north and south poles at equal intervals as shown in FIG. 17, the armature windings 2 will be connected as shown in FIG. 18. In FIG. 18, each connecting point among armature windings 2-1, ..., 2-7 is connected to a semiconductor rectifying device 13. When currents are supplied to the windings 2-1, ..., 2-7 in appropriate directions, the rotor rotates according to Fleming's rule. The semiconductor rectifying devices 13 serve as detectors for feeding currents to windings 2-1, ..., 2-7 in appropriate directions. When position detecting elements 10 (not shown in FIG. 18) of semiconductor rectifying devices 13-1, 13-2 and 13-3 detect the north poles, a transistor Tr1 is turned on. When the position detecting elements 10 of semiconductor rectifying devices 13-4, 13-5, 13-6 and 13-7 detect the south poles, a transistor Tr2 is turned on. Therefore, it seems that the current through the windings 2-1, 2-2 and 2-3 flows to windings 2-4, 2-5, 2-6 and 2-7. However, in the motor in which the windings are connected as shown in FIG. 18, connecting points 20-1, ..., 20-3 are at the same potential. Therefore, when a back electromotive force occurs, no current flows through the windings 2-1, ..., 2-3 due to short circuiting. Further, because the connecting points 20-5 and 20-6 are at the same potential as the connecting points 20-4 and 20-7, no current flows through the windings 2-5 and 2-6. Namely, with the connecting method as shown in FIG. 18, current flows only through two windings 2-1 and 2-4 respectively positioned between the connecting points 20-1 and 20-7 and between 20-3 and 20-4 which are at different potential. Stated differently, five of the seven windings 2-1, ..., 2-7 do not contribute to generation of torque, and a sufficient torque cannot be obtained. If the number of windings 2 is further increased for the purpose of obtaining a higher torque, the number of the windings through which current does not flow also increases. In the past, a very complicated connecting method was used to eliminate this problem.

Figure 19:
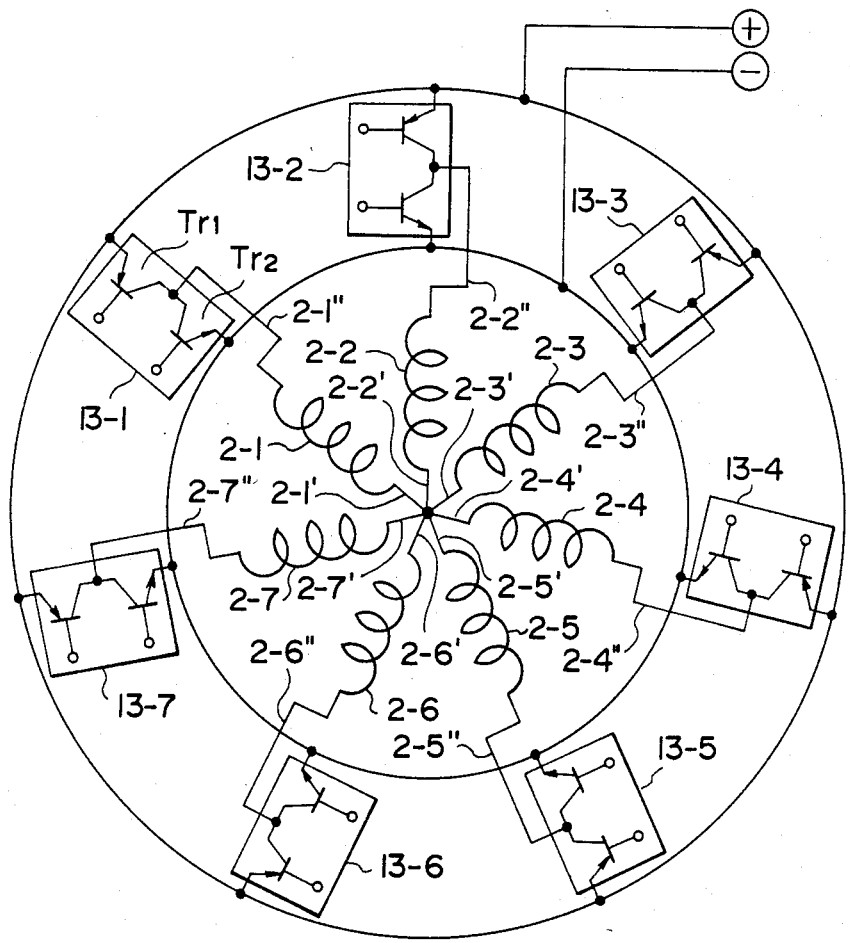
FIG. 19 is an explanatory view showing an embodiment the armature winding connections employed in the motor in accordance with the present invention.

In the present invention, this problem is solved by the connecting method shown in FIG. 19, which could not be anticipated in the past as evidenced by the fact that it was impossible to obtain a motor exhibiting a higher efficiency. The connecting method shown in FIG. 19 is effective when the motor is of disc type and brushless and when the number of the armature windings 2 positioned circumferentially is seven or more. When the connecting method shown in FIG. 19 is applied to the motor in accordance with the present invention, it will be understood that the present invention is novel and extremely useful.

FIG. 19 assumes the use of armature windings 2-1, . . . , 2-7 positioned as shown in FIG. 16 and the field magnet 1 as shown in FIG. 17. In FIG. 19, terminals 2-1', . . . , 2-7' of the armature windings 2-1, . . . , 2-7 are connected to a common line in the motor M. The other terminals 2-1'', . . . , 2-7'' thereof are connected to terminals of respective rectifying devices 13-1, . . . , 13-7. These rectifying devices may be positioned exterior of the motor M.

Figure 20:
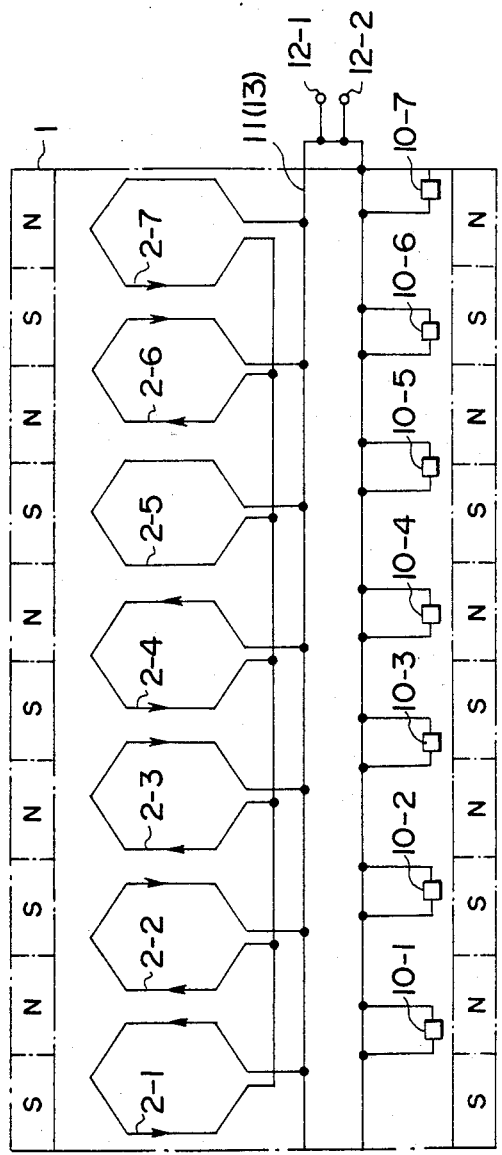
FIG. 20 is a developed view showing the arrangement of the armature windings shown in FIG. 19 and the field magnet.

FIG. 20 is a developed view showing the arrangement of the armature windings 2 shown in FIG. 19 and the field magnet 1. FIG. 20 assumes that the position detecting elements 10-1, . . . , 10-7 are placed on the radial conductor sections of the armature coils 2-1, . . . , 2-7, which contribute to generation of torque. As shown in FIG. 20, the element 10-5 is opposed to the boundary between the north pole and the south pole and, therefore, no output occurs therefrom and no current flows through the armature winding 2-5. However, elements 10-1 to 10-4, 10-6 and 10-7 are opposed to the north or south poles and detect them. Accordingly, currents flow through the armature windings 2-1 to 2-4, 2-6 and 2-7 as shown in FIG. 20. For example, in the semiconductor rectifying device 13-1 shown in FIG. 19, the transistor Tr1 is turned on because the element 10-1 is opposed to the north pole. In the rectifying device 13-2, the transistor Tr2 is turned on because the element 10-2 is opposed to the south pole. Accordingly, a current flows through the terminal 2-1'', armature winding 2-1, terminal 2-1', connecting point 21 and terminal 2-2'. Currents flow also through the other windings in the same way.

Accordingly, with the connecting method shown in FIGS. 19 and 20, six of the seven armature windings 2 are energized and can be used effectively to generate a torque. On the other hand, with the connecting method shown in FIG. 16, only two of the seven armature windings 2 are used to generate a torque. The number of the windings not utilized is doubled when they are positioned for both sides of the field magnet 1, and further increases when the number of armature windings 2 increases. However, with the connecting method shown in FIGS. 19 and 20, even if some of the armature windings 2 are not energized, the time of this condition is very short and they are then immediately energized. Therefore, this connecting method makes it possible to effectively energize the armature windings 2, and increase the torque and efficiency of the motor M. Further, if the number of the armature windings 2 positioned on one side is 7, 9, 11, . . . , it is possible to obtain a motor M of 7 phases, 9 phases, 11 phases, . . . , on one side. In this way, motors M exhibiting excellent characteristics can be obtained.

For the reason described above, the connecting method shown in FIGS. 19 and 20 is employed in the embodiment shown in FIG. 12 in accordance with the present invention.

Figure 21:
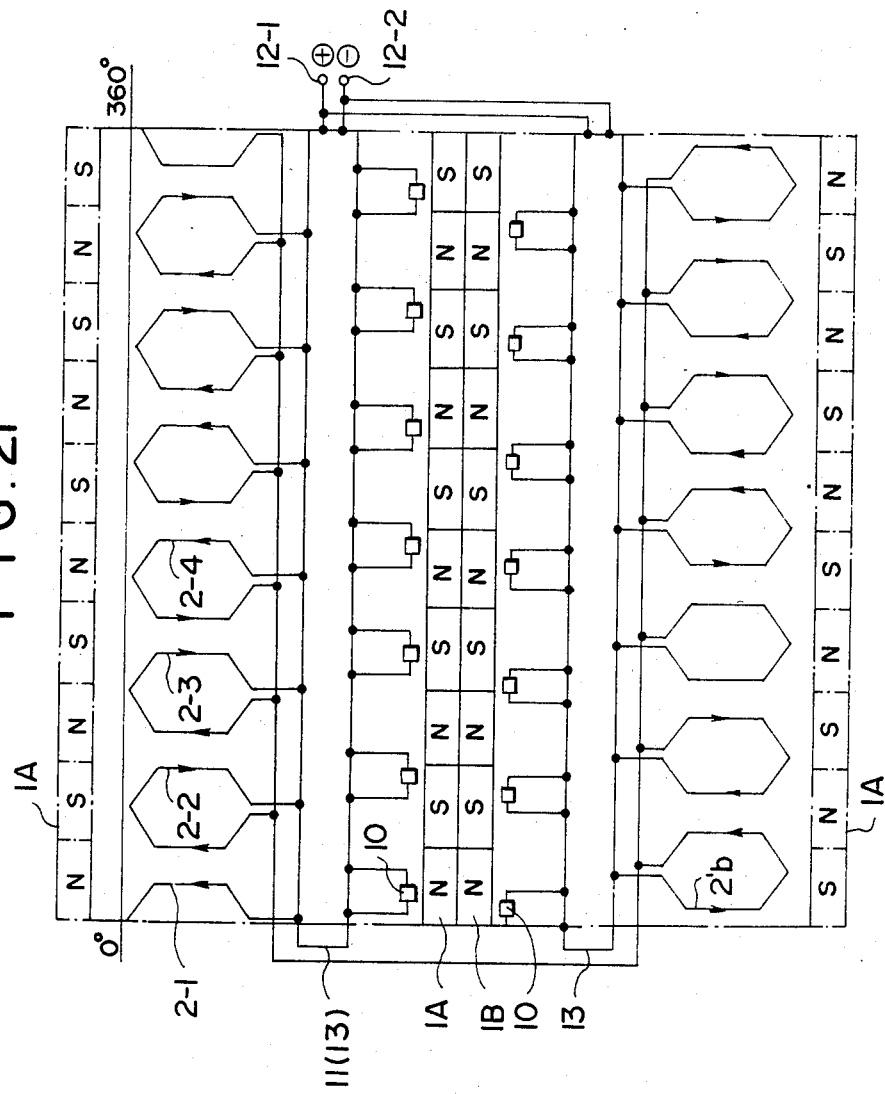
FIG. 21 is a developed view showing another embodiment of the arrangement of the armature windings and the field magnet (segments) employed in the motor in accordance with the present invention.

FIG. 21 is a developed view showing another embodiment of the arrangement of seven or more armature windings 2' positioned circumferentially and the field magnet employed in the motor in accordance with the present invention. In the embodiment shown in FIG. 21, the number of the armature windings 2' energized is further doubled compared with the arrangement shown in FIGS. 19 and 20. Therefore, the number of phases of the motor M can also be doubled, and the torque ripple can be reduced extremely. The connecting method shown in FIG. 21 will be understood from the above descriptions.

As described above, with the motor in accordance with the present invention, it is possible to increase the number of armature windings and to construct a polyphase motor. Accordingly, the disc type brushless motor in accordance with the present invention can generate a large torque, exhibit high efficiency, and smoothly rotate with extremely reduced torque ripple. Accordingly, the motor in accordance with the present invention is suitable for special apparatuses which required to exhibit high performance, such as video and medical equipment. Further, because of the brushless construction, the service life of the motor in accordance with the present invention is long. In addition, the motor in accordance with the present invention can be made very thin in the axial direction because the armature windings scarcely overlap one upon another even when the number thereof is increased.

Figure 22:
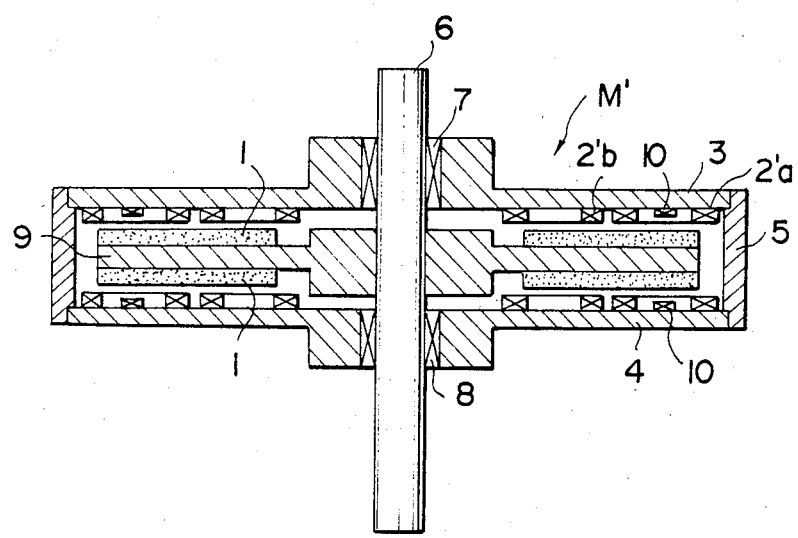
FIG. 22 is a longitudinal sectional view showing another embodiment of the motor in accordance with the present invention.
Figure 23:
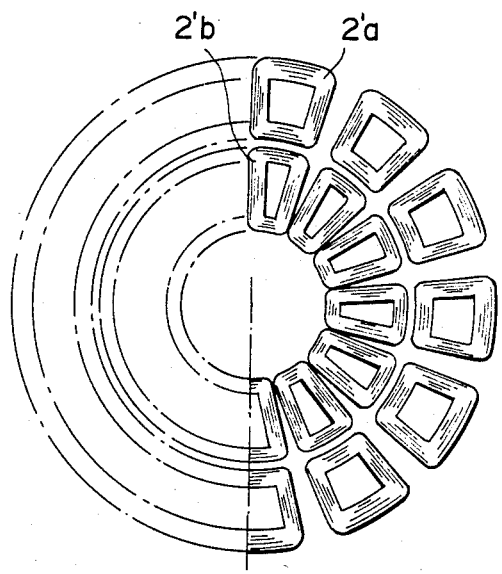
FIGS. 23 and 24 are explanatory views showing embodiments of the armature windings used in the motor shown in FIG. 22.
Figure 24:
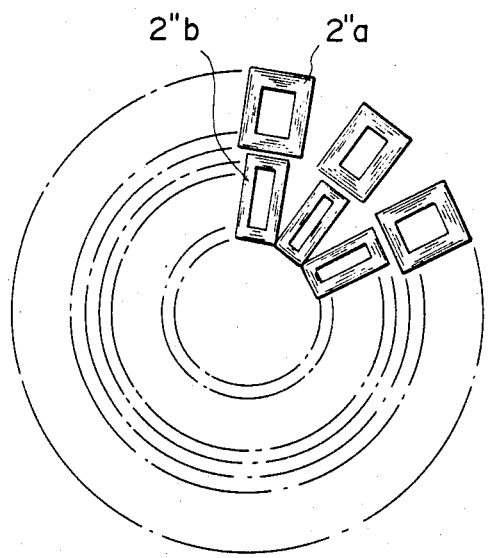

FIG. 22 shows another embodiment of the motor in accordance with the present invention. In FIG. 22, a disc type brushless motor M' in accordance with the present invention has approximately the same construction as the motor M shown in FIG. 8, except for the arrangement of armature windings 2'a and 2'b. As shown in FIG. 23, each outer armature winding 2'a and each inner armature winding 2'b are positioned in phase with each other in the circumferential direction so that they can be used as one set. Therefore, as shown in FIG. 22, the position detecting element 10 is positioned only in the loop of each outer armature winding 2'a. The armature windings 2'a and 2'b are in the fan loop form as shown in FIG. 23. However, it is also possible to use square loop-like armature windings 2''a and 2''b as shown in FIG. 24, provided that the necessary conditions are satisfied. As already described above with respect to the field magnet segments 1A, 1'A, 1B and 1'B, a particularly high torque is required at the outer circumference in the case of a rotating motor. For this reason, the outer armature winding 2'a is looped more turns than the inner armature winding 2'b. This also applies to the armature windings 2''a and 2''b shown in FIG. 24. In this way, it is possible to obtain the required torque at low cost. It is advantageous that the circumferential conductor sections of the fan loop-like armature windings 2'a and 2'b shown in FIG. 23 and the square loop-like armature windings 2''a and 2''b in FIG. 24, which do not contribute to generation of torque, be bent at right angles with respect to the radial conductor sections thereof for the purpose of reducing the spaces between the windings 2'a and 2'b, and between the windings 2''a and 2''b.

In the embodiment shown in FIG. 22, when a position detecting element detects the north or south pole, a current is caused to flow in the appropriate direction through the corresponding armature winding to rotate the rotor means according to Fleming's rule.

Figure 25:
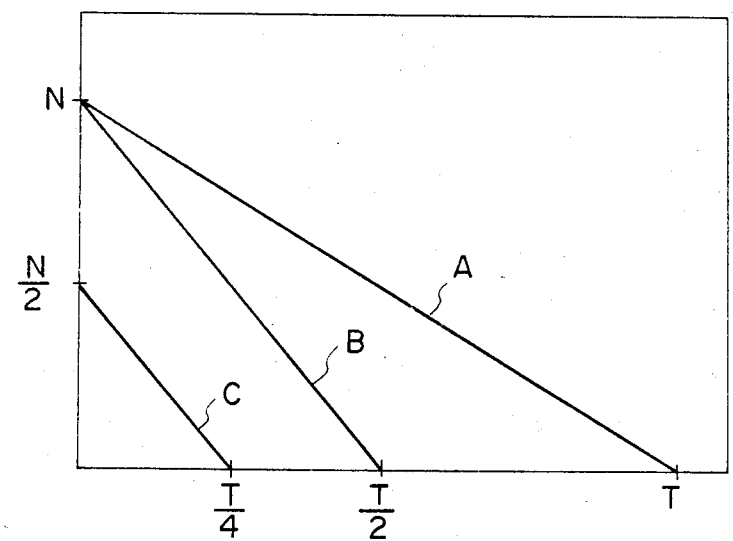
FIG. 25 is a graph showing the rotation speed-torque characteristics of the motor shown in FIG. 22.

FIG. 25 shows the rotation speed-torque characteristics of the motor shown in FIG. 22. As shown in FIG. 25, when the voltage is constant and a set of two windings $2'a$ and $2'b$ are connected in parallel with each other and energized, it is possible to obtain a high rotation speed (N) and a high torque (T) as shown by a line A. When only one of the windings $2'a$ and $2'b$ is energized, it is possible to obtain a high rotation speed (N) and a torque of T/2 as shown by a line B. When the windings $2'a$ and $2'b$ are connected in series with each other, it is possible to obtain a rotation speed of N/2 and a torque of T/4 as shown by a line C. In this way, in accordance with the present invention, it is possible to obtain a disc type brushless motor which can exhibit various characteristics by slightly changing the wire connection.

As described above, in accordance with the present invention, it is possible to easily form strong armature windings at a low cost and to obtain an excellent motor exhibiting various characteristics with slight modification. Further, the number of the armature windings in the motor can be increased without superposing them one upon another and, therefore, the number of phases of the motor can be greatly increased. Thus it is possible to obtain a disc type brushless motor capable rotating smoothly with greatly reduced torque ripple. Further, the motor in accordance with the present invention can be made very thin and exhibit high efficiency. It can also be mass-produced at a low cost.

It will be noted that the above-described electric motor can be used in any field. Particularly in an image scanning system, the electric motor is useful in feeding or moving an image recording or bearing medium in the sub-scanning direction perpendicular to the main-scanning direction. The image recording or bearing medium is moved at a constant speed in the sub-scanning direction in an image scanning system for an image recording or read-out system. As is well known in the art, the image scanning system for an image recording or read-out system employs a main scanning means for scanning an image recording or bearing medium at a high speed repeatedly in one direction and a sub-scanning means for scanning the medium at a comparatively low speed in a direction perpendicular to said main scanning direction. In the sub-scanning means, a motor is often used to feed the medium at a constant speed. The electric motor in accordance with the present invention can advantageously be used in the above-mentioned image scanning system.

We claim:

1. A disc type brushless motor comprising a rotor means provided with a 2 m-pole field magnet consisting of north and south poles alternately positioned, wherein m designates a positive integer of 1 or larger, and a stator means provided with loop-like armature power windings in which the angle between the radial conductor sections of each armature power winding is approximately equal to the pole width of said field magnet, said armature power windings being flatly positioned opposite to said field magnet in quantity of two or more in the circumferential direction of said stator means and in two stages or more in the radial direction thereof, said stator means being also provided with position detecting elements for detecting said poles of said field magnet.

2. A motor as defined in claim 1 wherein each set of the outer and inner armature power windings are positionally shifted with respect to each other in the circumferential direction of said stator means.

3. A motor as defined in claim 1 wherein the sets of the outer and inner armature power windings do not overlap one upon the other in the radial direction of said stator means.

4. A motor as defined in claim 1 wherein the outer armature power windings are looped more turns than the inner armature power windings.

5. A motor as defined in claim 1 wherein the armature power windings are positioned at equal intervals in the circumferential direction so that they do not overlap one upon another in the circumferential direction of said stator means.

6. A motor as defined in claim 1 wherein the armature power windings are in the fan loop-like form.

7. A motor as defined in claim 1 wherein the armature power windings are in the square loop-like form.

8. A motor as defined in claim 1 wherein seven or more armature power windings are positioned in the circumferential direction of said stator means, and one terminal of each armature power winding is connected to a common line.

9. A motor as defined in claim 8 wherein the other terminal of each armature power winding is connected to a semiconductor rectifier.

10. A motor as defined in claim 1 wherein a field magnet is flatly secured to either surface of a disc-like yoke which is made of a magnetic material and secured at right angles to a rotatably supported rotating shaft, and two groups of the armature power windings are opposed one to the field magnet on each surfaces of said yoke.

11. A motor as defined in claim 1 wherein each pole of said field magnet consists of a plurality of field magnet segments positioned within a pole width equal to the angle calculated by dividing the circumference of said field magnet by 2 m, wherein m designates a positive integer of 1 or larger.

12. A motor as defined in claim 11 wherein said field magnet segments are in the fan-like plate form.

13. A motor as defined in claim 11 wherein said field magnet segments are in the square plate form.

14. A motor as defined in any of claims 11 to 13 wherein the outer field magnet segments have a stronger magnetic force than the inner ones.

15. A motor as defined in claim 1 wherein one position detecting element is provided for each armature power winding.

16. An image scanning system comprising a main scanning means for scanning an image recording or image bearing medium in one direction repeatedly at a high speed with a light beam and a sub-scanning means for moving said medium in a direction perpendicular to said direction at a comparatively low speed, whereby scanning the medium two-dimensionally, wherein said sub-scanning means comprises the motor as defined in claim 1.

17. A disc type brushless motor comprising a rotor means provided with a 2 m-pole field magnet consisting of north and south poles alternatively positioned, wherein m designates a positive integer of 1 or larger, and a stator means provided with loop-like armature windings in which the angle between the radial conductor sections of each armature winding is approximately equal to the pole width of said field magnet, said armature windings being flatly positioned opposite to said field magnet in quantity of two or more in the circumferential direction of said stator means and in two stages or more in the radial direction thereof, and wherein the outer armature windings are looped more turns than the inner armature windings, said stator means being also provided with position detecting elements for detecting said poles of said field magnet.

18. A disc type brushless motor comprising a rotor means provided with a 2 m-pole field magnet consisting of north and south poles alternately positioned, wherein m designates a positive integer of 1 or larger, and a stator means provided with loop-like armature windings in which the angle between the radial conductor sections of each armature winding is approximately equal to the pole width of said field magnet, said armature windings being flatly positioned opposite to said field magnet in quanitty of two or more in the circumferential direction of said stator means and in two stages or more in the radial direction thereof, and wherein the outer field magnet segments have a stronger magnetic force than the inner ones, said stator means being also provided with position detecting elements for detecting said poles of said field magnet.

19. An image scanning system comprising a main scanning means for scanning an image recording or image bearing medium in one direction repeatedly at a high speed with a light beam and a sub-scanning means for moving said medium in a direction perpendicular to said direction at a comparatively low speed, whereby scanning the medium two-dimensionally, wherein said sub-scanning means comprises a disc type brushless motor comprising a rotor means provided with a 2 m-pole field magnet consisting of north and south poles alternately positioned, wherein m designates a positive integer of 1 or larger, and a stator means provided with loop-like armature windings in which the angle between the radial conductor sections of each armature winding is approximately equal to the pole width of said field magnet, said armature windings being flatly positioned opposite to said field magnet in quantity of two or more in the circumferential direction of said stator means and in two stages or more in the radial direction thereof, said stator means being also provided with position detecting elements for detecting said poles of said field magnet.

* * * * *

UNITED STATES PATENT AND TRADEMARK OFFICE
CERTIFICATE OF CORRECTION

PATENT NO. : 4,551,645

DATED : November 5, 1985

INVENTOR(S) : TAKAHASHI et al.

It is certified that error appears in the above-identified patent and that said Letters Patent is hereby corrected as shown below:

On the title page

[30] Foreign Application Priority Data

June 4, 1981    Japan  --------------------------  86300/81

July 14, 1981    Japan  --------------------------110 171/81 --

Signed and Sealed this

Ninth Day of December, 1986

Attest:

DONALD J. QUIGG

*Attesting Officer*    *Commissioner of Patents and Trademarks*